United States Patent
Slein

(10) Patent No.: US 7,437,668 B2
(45) Date of Patent: Oct. 14, 2008

(54) SYSTEM AND METHOD FOR AUTONOMOUS CORRECTION OF DEFECTIVE DOCUMENTS

(75) Inventor: Judith A. Slein, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 371 days.

(21) Appl. No.: 11/088,204

(22) Filed: Mar. 24, 2005

(65) Prior Publication Data

US 2006/0218442 A1    Sep. 28, 2006

(51) Int. Cl.
G06F 17/27    (2006.01)
(52) U.S. Cl. .................. 715/255; 715/229
(58) Field of Classification Search ............ 715/511, 715/229, 255; 707/200–204; 717/168–178
See application file for complete search history.

(56) References Cited

U.S. PATENT DOCUMENTS

| | | | | |
|---|---|---|---|---|
| 5,903,897 A * | 5/1999 | Carrier et al. | ............... | 707/203 |
| 5,983,241 A * | 11/1999 | Hoshino | ............... | 707/203 |
| 6,272,678 B1 * | 8/2001 | Imachi et al. | ............... | 717/122 |
| 6,658,624 B1 | 12/2003 | Savitzky et al. | ............... | 715/513 |
| 7,113,952 B2 * | 9/2006 | Aoyama et al. | ............... | 707/100 |
| 7,117,432 B1 * | 10/2006 | Shanahan et al. | ............ | 715/512 |
| 7,171,618 B2 * | 1/2007 | Harrington et al. | ......... | 715/517 |
| 7,240,279 B1 * | 7/2007 | Chartier et al. | ............ | 715/513 |
| 2002/0019827 A1 * | 2/2002 | Shiman et al. | ............. | 707/200 |
| 2002/0065848 A1 * | 5/2002 | Walker et al. | ............... | 707/511 |
| 2003/0033288 A1 * | 2/2003 | Shanahan et al. | ............ | 707/3 |
| 2003/0115544 A1 * | 6/2003 | Henry et al. | ................ | 715/500 |
| 2004/0205448 A1 * | 10/2004 | Grefenstette et al. | ....... | 715/500 |
| 2004/0205574 A1 | 10/2004 | Sayers et al. | ............... | 715/513 |
| 2005/0071755 A1 * | 3/2005 | Harrington et al. | .......... | 715/511 |
| 2005/0262432 A1 * | 11/2005 | Wagner | ..................... | 715/511 |

FOREIGN PATENT DOCUMENTS

EP    1087306 A2 *   3/2001

OTHER PUBLICATIONS

Horst Bunke, Rene Gonin, and Daniel Mori, A Tool for Versatile and User-friendly Document Correction, 1997, IEEE, p. 433-438.*

* cited by examiner

Primary Examiner—William L. Bashore
Assistant Examiner—Ashraf Zahr
(74) Attorney, Agent, or Firm—Oliff & Berridge, PLC

(57) ABSTRACT

A system and method for autonomous correction of defective documents include an autonomous document. The autonomous document can signal a history server whenever an operation such as printing, scanning, editing, distribution, storage, or retrieval is performed on the document. The history server can be queried to determine when a given defect was introduced into a document, and which instances of the document contain the defect. Based on this information, notifications can be sent to all users who were ever in possession of one of the defective instances, and the defective instances can be automatically corrected. Since the document instances are active entities, they can receive and act on notifications of defects in themselves, follow instructions on how to correct the defect, and notify the history server once the defect has been corrected. The document can act without permission from any user in possession of the document.

18 Claims, 4 Drawing Sheets

SYSTEM AND METHOD FOR AUTONOMOUS CORRECTION OF DEFECTIVE DOCUMENTS

BACKGROUND

Exemplary embodiments are directed to a system and method for automated correction of defective documents. Specifically, the exemplary embodiments provide a system and method for notifying a document of defects, providing the document with instructions to correct the defects, enabling new workflows where the document can be self-repairing, and allowing for the defects to be automatically eliminated.

When a consumer product, for example, is discovered to be defective, the manufacturer may recall the product. A registry of owners may be used to notify owners of the defect. News media and other channels may also be used to notify owners and the public of the defect. The owner may then take the initiative to return the product for repair or replacement.

Similarly, if a document is defective, attempts may be made to notify those who have a copy of the document, repair the document, and replace the defective document. For example, a document may be disseminated through electronic mail (e-mail). If an error is discovered or introduced into that document, those who have received the document may be notified and the error potentially corrected. For example, electronic mail providers, such as, for example, Microsoft Exchange, provide a "recall/replace" operation wherein mail messages in a recipient's inbox, that have not been read, may be recalled and/or replaced.

In another example, a document, such as, for example, a newspaper, may be printed, copied, and then handed to one or more persons. If a news organization makes a mistake, it publishes a correction in the newspaper in an attempt to notify consumers who may have been misled by the mistake.

SUMMARY

According to the exemplary embodiments, a system and method are provided that may keep track of document copies, how they relate to each other, where they are, and be able to correct the documents when errors are discovered or introduced to the documents. For example, in a government printing office, law firm office, or the like, large quantities of documents are produced and disseminated. It is important for these types of documents to be accurate and authenticated. It is also important to know that the documents have not been tampered with and are not defective. If an error is discovered or introduced into one of the documents, it would be desirable to be able to trace all copies of the defective document, and/or recover the defective documents, and/or replace or correct the defective documents.

In exemplary embodiments, documents that have been e-mailed may be retrieved and corrected even if a recipient of the document has already received an electronic copy of the document. For example, a copy of a defective document stored in a repository could be replaced or corrected and then the recipient of the document may be notified that a change had been made to the document.

In exemplary embodiments, as documents are manipulated, a history of the actions taken on the document may be recorded with a history server. When a document is discovered to be corrupt, the history may be queried to determine when the corruption occurred and to identify all corrupt instances of the document. The document may be informed of the appropriate steps required to repair itself. Documents may be automatically corrected without the need to obtain permission from a user.

For example, in a business setting, where all employees share a common network, a document may be forwarded via e-mail to, for example, a number of executives, each of whom may or may not make changes to the document, and errors may inadvertently be introduced into the document. The executives may forward their respective version of the document to a number of employees. The creation of the document, who it was forwarded to, what if any changes were made to the document, and any other subsequent action taken, including who receives the original document or subsequent versions of the document may be recorded with a history server. If an error was introduced into one of the versions of the document, by, for example, one of the executives who in turn forward the defective document to a number of employees, the defective documents may be automatically corrected. That is, the document may be given instructions as to how to correct itself, and may correct itself without the need to further involve any of the employees that have procured the defective/now corrected document. Furthermore, the employees may or may not be notified that any change to the document has been made. Thus, the document may be autonomous in that the document may correct itself independently from a user, i.e., the employee having access to the document.

In other words, the exemplary embodiments build on the notion of an autonomous document. An autonomous document is an active entity containing operational code as well as data. For example, an autonomous document is capable of signaling a history server whenever an operation such as printing, scanning, editing, distribution, storage, or retrieval is performed on the document. The history server can be queried to determine when a given defect was introduced into a document, and which instances of the document contain the defect. Based on this information, notifications can be sent to all users who were ever in possession of one of the defective instances, and the defective instances can be automatically corrected. Since the document instances are active entities, they can receive and act on notifications of defects in themselves, following instructions on how to correct the defect, and notifying the history server once the defect has been corrected.

Automatic document correction, built on the infrastructure of an autonomous document and a history server, may have many useful applications. This is particularly true for legal documents, government publications such as, for example, the Congressional Register, financial instruments, and the like where the integrity of the document is critical. Here the ability to locate all corrupted instances and correct them is of great value.

DETAILED DESCRIPTION OF EMBODIMENTS

Figure 1:
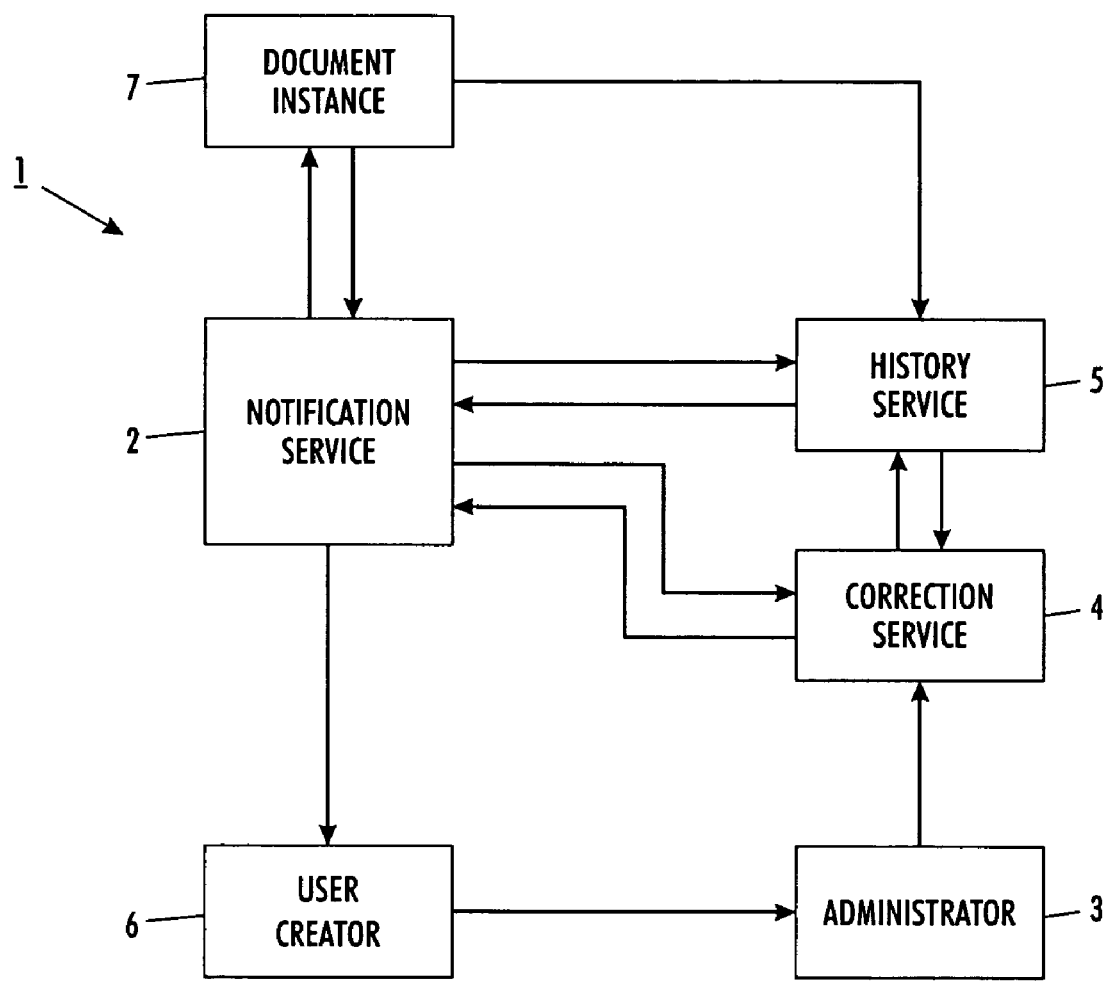
FIG. 1 is a block diagram illustrating a system for autonomous correction of defective documents in an exemplary embodiment.

Exemplary embodiments are directed to a system and method for automated correction of defective documents. Specifically, with reference to FIG. 1, the exemplary embodiments provide a system 1 having active documents 7 capable of correcting themselves, a notification service 2 for notifying a document and document users 6 of defects, providing the document 7 with instructions via the administrator 3 and/or user 6, through a correction service 4 that interacts with the history server 5 and, through the notification service 2, with the documents 7 themselves to correct the defects. That is, the document 7 informs the history server 7 whenever it performs any operation, and the document corrects itself upon receiving instructions from the correction service 4 via the notification service 2. The history of each action taken by the document, including creation of the document, changes to the document, forwarding the document, etc., may be recorded and monitored by the history server 5. The system 1 enables new workflows where the document can be self-repairing and allows for the defects to be automatically eliminated. Features of the system 1 and method for automated correction of defective documents are described in more detail below with reference to FIGS. 1-4.

A document is an assembly of information collected for human consumption. The information may be stored in one or more electronic files, printed on one or more paper pages, or the like. Copies of the document may be made in either an electronic or a hardcopy form. Each copy may be defined as a document instance.

Figure 2:
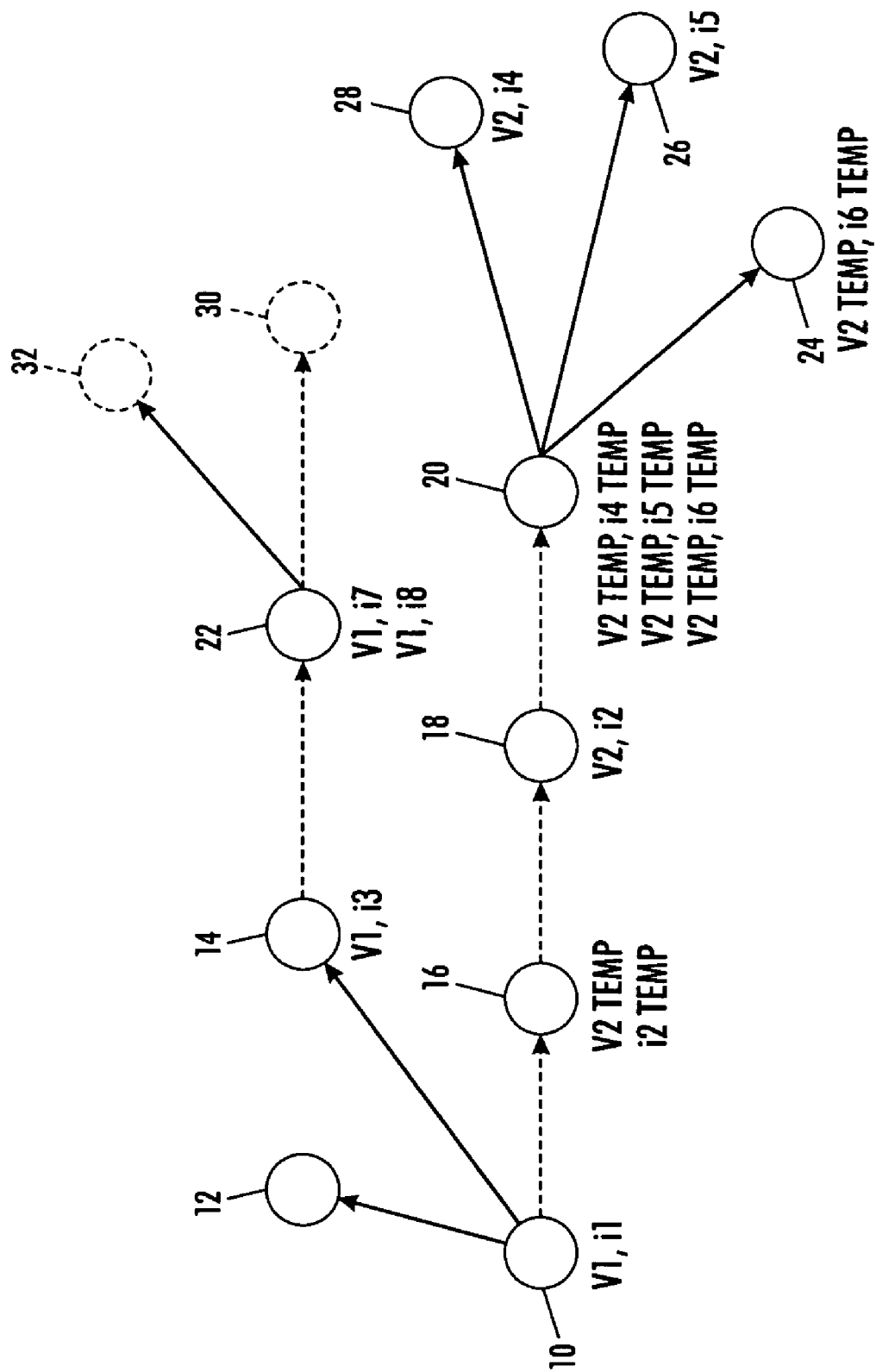
FIG. 2 is a schematic of a document history graph in an exemplary embodiment.

The document history server 5 contains information about the document and each of the document's instances (e.g., copies of the document). When the information within a document is altered, the altered document may be called a revision of the original document. The document history may be defined, for example, by a graph. Referring to FIG. 2, a document history graph is illustrated where each node in the graph represents an event that occurs to some document instance of some revision of the document.

The document is autonomous in that the document contains operational code as well as data. Accordingly, the autonomous document contains code as well as information intended for human consumption. The code may enable the document to perform standard operations, such as storing itself, printing itself, performing editing operations, setting metadata values, etc. The code also enables the document to notify the document history server 5 of each operation the document performs, and to watch for notifications of events to which the document needs to respond. In this way, the document can be notified, by, for example, the notification service 2, when a defect is discovered, and may be instructed to correct the defect. An autonomous document is active only when its code is loaded in memory in a form that can be invoked. Otherwise it is dormant. For example, hard copies of a document that are manually distributed to a number of different people may be dormant, whereas electronic copies distributed and stored by a common network may be active.

The document history server 5 watches for notifications of significant events in the life cycle of all documents, and records all events for which it receives notifications. These events may include document creation, alteration (resulting in a new revision of the document), creation of a new instance (e.g., new copy of the document), distribution and viewing of instances, and the like. Information recorded for each event might include an instance identifier, what operation was performed, which person initiated the operation, what device or service performed the operation, a delta for a change operation, and the like.

Thus, the document history may be constructed from the information available on the document history server 5. Document histories may be queried or viewed and analyzed to determine where in the document history graph a defect was introduced.

Referring to FIG. 2, a document may be created and identified as version 1, instance 1 (v1i1), as shown at node 10. The document may be read by a person, as shown at node 12; stored, as shown at node 14; and/or edited, as shown at node 16. Once the document is edited, it may be identified as a temporary version 2, temporary instance 2 (v2temp, i2temp). If stored after editing, as shown at node 18, the document may then be identified as version 2, instance 2 (v2i2). For example, after the document (v2i2) is stored, it may be mailed to a number of different recipients and then identified as (v2temp, i4temp) for the first recipient, (v2temp, i5temp) for the second recipient, (v2temp, i6 temp) for the next recipient, etc., as shown at node 20. After each recipient receives the document, each of the documents may be stored, deleted, or another event may occur to each of the documents for each recipient. For example, mailed documents (v2temp, i4temp), (v2temp, i5temp), and (v2temp, i6 temp) may be stored for the first recipient, stored for the second recipient, and deleted for the next recipient, respectively, and correspondingly identified as documents (v2, i4), (v2, i5) and (v2, i6), as shown at nodes 28, 26 and 24, respectively.

Alternatively, after the created document (v1, i1) is stored at node 14, the stored document version 1, instance 3 (v1, i3) may be printed once or multiple times, as shown at node 22. Each printed document may be individually identified. The stored document (v1, i3) may be identified as, for example, version 1, instance 7 (v1, i7) after a first copy is printed; and version 1, instance 8 (v1, i8) after a second copy is printed. Following printing, the documents (v1, i7) and (v1, i8) may continue to events unknown, as shown at nodes 30 and 32. That is, the documents may be subject to any number of events, and individually identified at each event. It is envisioned that other similar events may be implemented in addition to or instead of the versions and instances discussed herein. Thus, the exemplary embodiments are not limited solely to the embodiments described herein but may encompass a plethora of different combinations of versions and instances of the autonomous documents described herein.

There are any number of instances of documents available in any number of formats. For example, some documents may be electronic, paper, in different versions, etc. Version 1 of the document may be printed, instance 7 and instance 8 of the version 1 document may be stored, printed, edited, deleted, forwarded to a recipient, or may be subject to any other like event. Each of the versions of documents and instances of the documents may be recorded in the document history.

Referring again to FIG. 2, once an event that introduces a defect has been identified, then all the nodes to the right of that event in the document history graph are affected. For example, in FIG. 2, if the edit operation, shown at node 16, document (v2temp, i2temp), introduced a defect, the document (v2temp, i2temp) created by the edit operation is affected, as are (v2, i2) created by the following store operation, (v2temp, i4temp), (v2temp, i5temp), and (v2temp, i6temp) created by the mail operation, and (v2, i4) and (v2, i5) created by the final store operations. A notification service can be used to send notifications to all people who initiated the affected events, warning them that the document instance they used was defective. Notifications may also be sent directly to the document instances, telling them how to correct themselves. Furthermore, notifications may or may not be sent to the people who may access the document instances to let them know that the document was corrected or otherwise edited or changed.

A process for automated correction of defective documents is described below with reference to FIG. 1-4. In an exemplary embodiment, a process for automatically correcting a defective document, a recipient or creator 6 of a document may detect an error in the document. An administrator 3 of the system 1 in which the document is located may then be notified of the error. The administrator 3 may define the error and notify a correction service 4, which corrects the error. The administrator 3 may be a person, an automated user interface, or any device that is capable of communication. The correction service 4 may ask the history server 5 to look for the first instance in which the document contained the error. The history server 5 will respond to the correction service 4 with the identifier of the document instance in which the error first occurred. For example, referring again to FIGS. 1 and 2, the history server 5 may inform the correction service 4 at which node in the graph of FIG. 2 the error occurred. Thus, all other nodes to the right of the error-identified node are also affected by the error.

After the location of the error and the affected nodes are defined by the history server 5, a correction for the error is defined by the administrator 3. The administrator 3 asks the correction service 4 to apply the correction. The correction service 4 communicates with the notification service 2 and then the document instances of each of the affected nodes are instructed to correct themselves. After the correction of the error is implemented, the history server 5 records that the correction has been made and to which instances the correction was made. The users 6 may be notified as part of the corrective action. For example, when each document instance has corrected itself, the document may notify the affected user 6, i.e., the owner of that document instance.

More specifically, with reference to FIG. 2, every time an operation is performed on an autonomous document, the document notifies the history server 5, which preserves a record of the operation. The record may include an identifier of the document, revision, instance that was input to the operation, an address of the document, an address for the output of the operation, what operation was performed, a date-time stamp, an identifier of the person responsible for the operation, and the like.

Other potentially useful information might be an identifier of the service or device used to perform the operation. Specific operations may require additional data to be recorded. For example, an edit operation requires a delta representing the changes made to the document. A change to a metadata entry requires an identifier of the entry that was changed, with the old and new values. This process of logging all events in the history of every autonomous document is what makes the automatic correction of defects possible.

Figure 3:
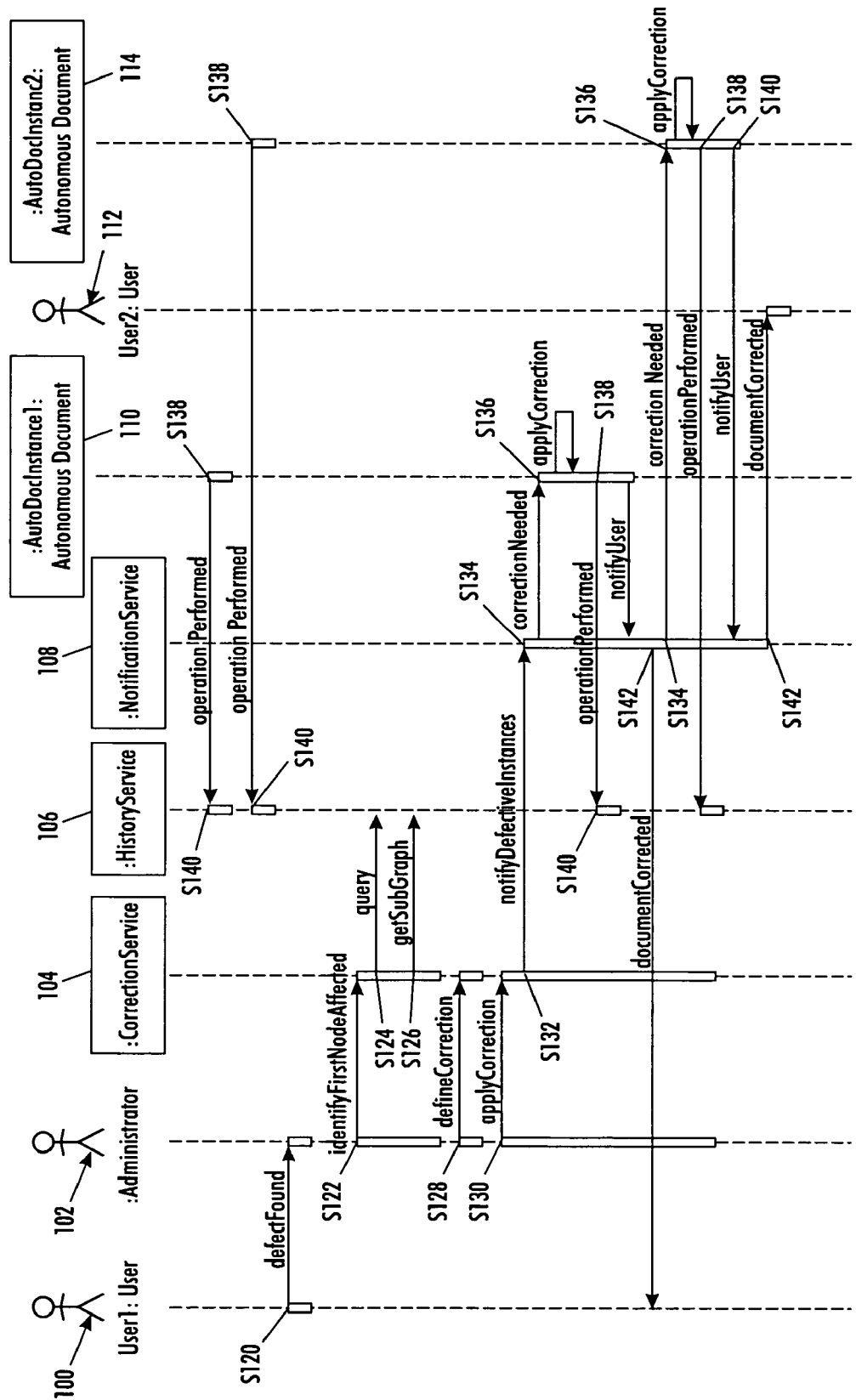
FIG. 3 is a schematic of a sequence diagram of the document correction process in an exemplary embodiment.

For example, referring to FIG. 3, a first user 100 may notice a defect in a document instance and may notify an administrator 102, as shown at step S120. The administrator 102 may ask a correction service 104 to identify a first node in the document's history that contains the defect, as shown at step S122. The correction service 104 may query a history server 106, as shown at step S124, to determine at which node in the document's history the defect was introduced. The correction service 104 may ask the history server 106 for a subgraph of all descendents of that node, as shown at step S126.

The administrator 102 may use the correction service 104 to compose an instruction to be sent out to all affected document instances, as shown at step S128, telling the document instances, for example, how to correct themselves. The instruction may be, for example, a script or a method call that the autonomous document knows how to execute, for example, to replace "oldText" with "newText". The administrator 102 may ask the correction service 104 to apply the correction to all affected document instances, as shown at step S130.

The correction service 104 may invoke the notification service 108, as shown at step S132, giving the notification service 108, for example, the subgraph (of all descendents of the affected node), and the instruction for correction of the affected node(s). As shown at step S134, the notification service 108 may then transmit the instructions to each affected node (document instance) 110 and 114, which then may apply the correction, as shown at step S136.

The notification service 108 may cause the necessary correction to be applied by activating each affected document instance (if it is not already active), and sending the affected document instance the instruction. The autonomous document instance 110 and/or 114 may then apply the necessary correction by performing the instruction, as shown at step S136. Furthermore, the autonomous document instance 110, 114 may notify the history server 106 that the autonomous document instance has performed the instruction, as shown at step S138. The history server 106 records the correction.

In addition, the definition of the correction created in S128 may include a message, for example, to be sent to all users identified in nodes of the affected subgraph. If so, the document instances 110 and 114 ask the notification service 108 to send the message to users as shown at step S140, for example, describing the defect and telling them how to obtain a corrected instance of the document. The notification service 108 sends the message to users 100 and 112 as shown in S142.

Figure 4:
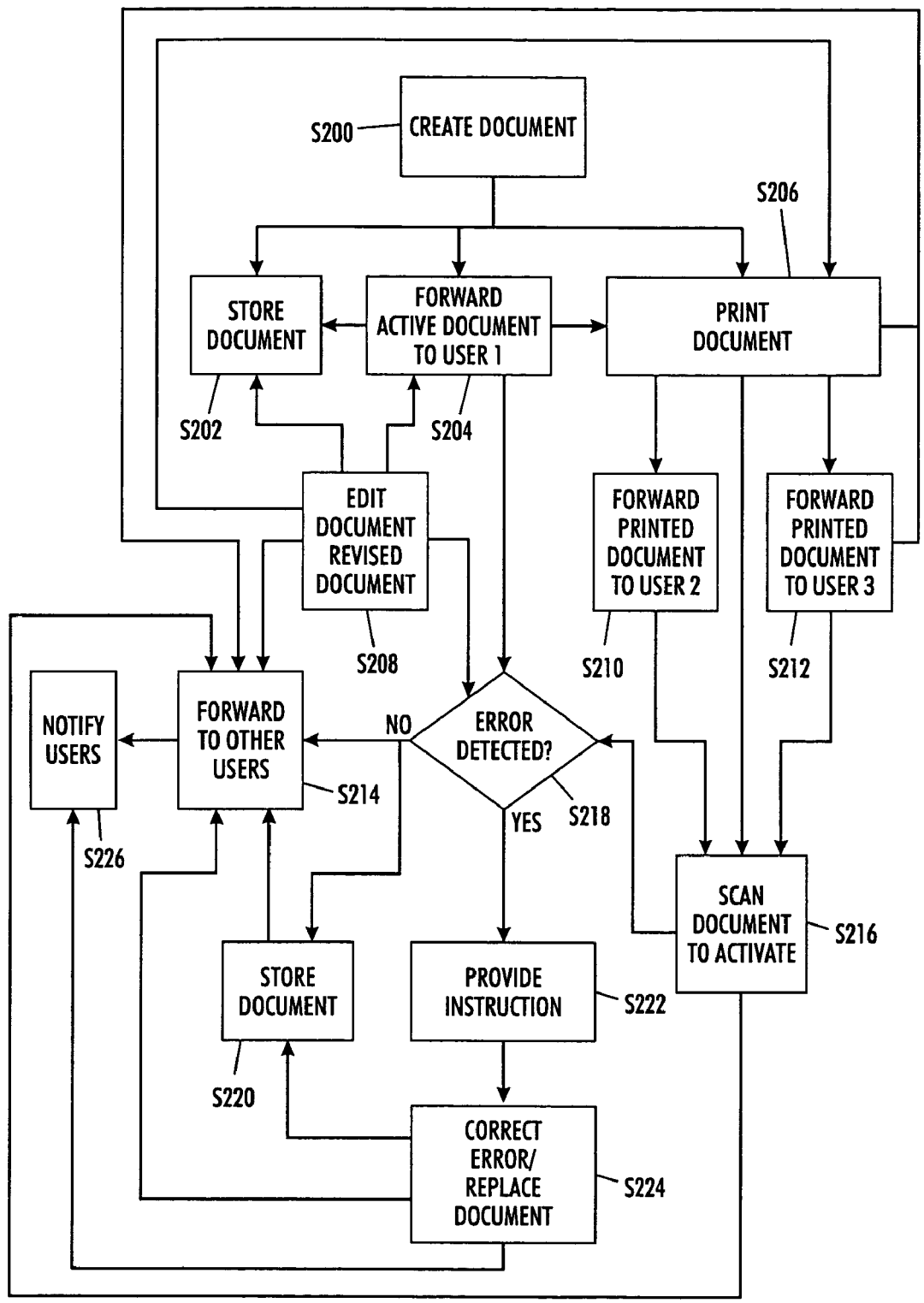
FIG. 4 is a flowchart illustrating a method for autonomous correction of the defective document in another exemplary embodiment.

There are numerous different possible variations for the process described herein. For example, a context in which the exemplary embodiments might operate is illustrated in FIG. 4. In another exemplary embodiment, a document may be created, as shown at step S200. The created document may be subject to a number of different actions. For example, the created document may be stored, forwarded to a first user, or printed, as shown at steps S202, S204 and S206, respectively. The first user may store the created document as shown at step S202 or may edit the document as shown at step S208, and then, if desired, store the edited document. The edited document may be printed, as shown at step S206. The created document and/or the edited document may be forwarded to any number of users after printing, for example, user 1 and user 2, as shown at steps S210 and S212. Alternatively, the created document or edited document may be stored for future use, as shown at step S202, or forwarded to any number of users, as shown at step S214.

Once the document is printed it is dormant. That is, any code associated with the document is not active. The dormant printed document (e.g., hard copy of the document) may be subsequently copied and forwarded to a number of different users, as shown at step S214. At any point, the dormant printed document, or any of the copied versions of the printed document, may be electronically scanned, for example, to activate the document, as shown at step S216.

A determination as to whether there is an error in any active document, whether previously edited or not, at any point in the history of the document, may be made, as shown at step S218. If no error is detected, the document may be stored, as shown at step S220 and/or forwarded to other users, as shown at step S214. If an error is detected, instructions for correction may be provided to the document, as shown at step S222. The document may apply the instructions to correct itself, as shown at step S224 and the corrected document may be subsequently stored, as shown at step S220 and/or forwarded to other users, as shown at step S214.

After correction or a change is made to the document, users having access to the document may be notified of the correction or change, as shown at step S226.

More complex cases may arise if the notification service 108 is unable to communicate with one or any of the document instances (e.g., document copies). For example, the document instance may be a paper, in a dormant state that cannot be activated. Or, the document instance may be electronic and separated from the notification service 108 by a computer firewall. Or, the document instance may be transient (not persistent), as in the case of an e-mail message, so that it is not addressable.

In another exemplary embodiment, these problems can be mitigated to some extent because descendents of these document instances may become accessible to the correction service 104, notification service 108, and history server 106 in the future. Autonomous documents retain their capabilities even through periods when they are dormant or are isolated from their supporting infrastructure. For example, as discussed above with reference to FIGS. 1 and 4, when a printed document instance is scanned, an active autonomous document instance results, and sends a notification of the scan operation to the history server 106.

If a document instance is mailed through a firewall, so that it can no longer find the infrastructure it needs to become active, some document instances may be lost to the history server 106, but if a descendent of that instance later comes back into the domain of the supporting infrastructure, the descendent will become active and send notifications of operations performed on it to the history server 106 once again.

Referring again to FIG. 2, if the notification service 108 reports to the correction service 104 all the undeliverable notifications, the correction service 104 may watch for events involving affected document instances or their descendents. For example, if a printed document instance, for example, version 1, instance 7 (v1i7) has a defect, when it is scanned, an event will be sent to the history server 106, saying that a scan operation was performed on (v1i7) to create version 1, instance 21 (v1i21). If the correction service 104 is monitoring for events involving (v1i7), it will see that a descendent of (v1i7) now needs to be corrected. The correction service 104 may then ask the notification service to notify the person or entity that scanned the document, and the new electronic instance can be notified and asked to correct itself.

The above-described exemplary embodiments describe only a small portion of the possible combination of documents, versions and instances with respect to autonomous correction of defective documents.

It will be appreciated that various of the above-disclosed and other features and functions, or alternatives thereof, may be desirably combined into many other different systems or applications. Also, various presently unforeseen or unanticipated alternatives, modifications or improvements therein may be subsequently made by those skilled in the art which are also intended to be encompassed by the following claims.

What is claimed is:

1. A system for correction of a defective copy of an autonomous document, the system comprising:
a computer system comprising a memory operably connected to a processor, a detection service, a notification service, a tracking service, and a history service;
the detection service to (1) identify a defective copy of an autonomous document, (2) identify a defective parent copy of the defective copy of the autonomous document where a defect originates, and (3) identify as defective substantially all copies of the defective parent copy created from the defective parent copy and containing defects;
the notification service to notify the defective copy of the autonomous document and an associated user of the defective copy of the autonomous document;
the tracking service to track multiple copies of the autonomous document, and to create linkages between each of the copies of the autonomous document and the respective parents and children of each of the copies of the autonomous document;
the history service to maintain a history of each copy of the autonomous document; and
a correction service embedded in the autonomous document to correct the defective copy of the autonomous document and instruct copies of the autonomous document, created from the defective copy of the autonomous document, to correct themselves, wherein the autonomous document is capable of correcting itself.

2. The system of claim 1, wherein the history includes information about:
when a copy of the autonomous document was created;
when the defect was introduced to the copy of the autonomous document; and
when the correction was made to the copy of the autonomous document.

3. The system of claim 1, wherein the autonomous document has code, the code enabling the autonomous document to perform a standard operation, wherein the standard operation includes at least one of storing, printing, editing, and setting meta data values of the autonomous document.

4. The system of claim 3, the code further enabling the autonomous document to notify the tracking service and the history service of each operation the autonomous document performs.

5. The system of claim 3, the code enabling the autonomous document to monitor for notifications of the defect.

6. The system of claim 3, the code further enabling the correction service to query the tracking service and the history service.

7. The system of claim 3, the code enabling the correction service to determine when the defect was introduced to the autonomous document and to identify the defective copy of the autonomous document.

8. The system of claim 3, the code enabling the autonomous document to receive and act on a notification of the defect, follow instructions on how to correct the defect, notify the tracking service and the history service that the defect has been corrected, and notify the user in possession of the defective copy of the autonomous document that the defect has been corrected.

9. A xerographic device or a software server including the system for correction of the defective copy of the autonomous document of claim 1.

10. A method for correction of a copy of an autonomous document, the method comprising:
identifying a defective copy of an autonomous document;
identifying a defective parent copy of the defective copy of the autonomous document where a defect originates, and identifying as defective substantially all copies of the defective parent copy created from the defective parent copy and containing the defect;

notifying a defective copy of the autonomous document and an associated user of the defective copy of the autonomous document;

tracking multiple copies of the autonomous document and maintaining a history of each copy of the autonomous document, the tracking comprising creating linkages between each of the copies of the autonomous document and respective parents and children of each of the copies of the autonomous document;

instructing the defective copy of the autonomous document to correct itself; and instructing copies of the autonomous document created from the defective copy of the autonomous document to correct themselves, wherein the autonomous document is capable of correcting itself, wherein a computer system performs all of identifying, notifying, tracking, and instructing.

11. The method of claim 10, further comprising:
querying the history of the autonomous document.

12. The method of claim 11, further comprising:
notifying a tracking service that the defective copy of the autonomous document and copies of the autonomous document created from the defective copy of the autonomous document have corrected themselves.

13. The method of claim 10, further comprising:
sending a message to all users having the defective copy of the autonomous document.

14. A computer system for correction of a defective copy of an autonomous document, the computer system comprising:
a memory operably connected to a processor;
means for identifying a defective copy of the autonomous document; means for identifying a defective parent copy of the defective copy of the autonomous document where a defect originates, and identifying as defective substantially all copies of the defective parent copy created from the defective parent copy and containing the defect;

means for notifying a defective copy of the autonomous document and a user of the defect;

means for tracking multiple copies of the autonomous document and maintaining a history of each copy of the autonomous document, the means for tracking comprising means for creating linkages between each of the copies of the autonomous document and respective parents and children of each of the copies of the autonomous document; and means for instructing the defective copy of the autonomous document to correct the defect, wherein the autonomous document is capable of correcting itself;

wherein a computer system includes means for identifying, notifying, tracking, maintaining, and instructing.

15. The system of claim 14, further comprising:
means for querying a history of the autonomous document; and
means for identifying when in the history of the autonomous document the defect occurred.

16. The system of claim 15, further comprising:
means for determining copies of the autonomous document created from the autonomous document.

17. The system of claim 16, further comprising:
means for notifying a tracking service and the history service that the defective copy of the autonomous document and copies of the autonomous document created from the defective copy of the autonomous document have performed instructions to correct the defect.

18. The system of claim 17, further comprising:
means for recording the correction with the history service and tracking service; and
means for sending a message to all users having access to the defective copy of the autonomous document or copies of the autonomous document created from the defective copy of the autonomous document.

* * * * *